US000001257H

United States Statutory Invention Registration [19]

[11] Reg. Number: H1257

[43] Published: Nov. 2, 1993

Schabdach et al.

[54] ENHANCED GRENADE LAUNCHER - BIG SHOT

[75] Inventors: Paul G. Schabdach, Churchville; Irving F. Barditch, Baltimore; John P. Fiala, Forest Hill; William G. Rouse, Aberdeen, all of Md.

[73] Assignee: The United States of America as represented by the Secretary of the Army, Washington, D.C.

[21] Appl. No.: 31,377

[22] Filed: Mar. 12, 1993

[51] Int. Cl.[5] ..... F23Q 7/02; F41C 11/02

[52] U.S. Cl. ..... 102/217; 42/69.01; 89/1.814

[58] Field of Search ..... 102/217; 42/69.01, 70.01, 42/70.11; 89/1.814

*Primary Examiner*—Daniel T. Pihaulic

*Attorney, Agent, or Firm*—Anthony T. Lane; Edward Goldberg; Michael Sachs

[57] ABSTRACT

An electrical system which serves to control the firing of multiple grenade launchers. The system generates multiple coded tone pairs for up to sixteen launchers which are provided to the launchers through a +28VDC line connected to the vehicular power supply. The tone pairs are decoded enroute to each launcher which exercise a firing circuit triggering the grenade launcher's firing squib causing the grenade to launch.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENHANCED GRENADE LAUNCHER - BIG SHOT

The invention described herein may be manufactured, used and licensed by or for the Government for Governmental purposes without payment to us of any royalties thereon.

BACKGROUND INFORMATION

1. Field of Invention

This invention relates generally to the field of fire control systems of weapons launchers. It more particularly relates to increasing the capacity of the grenade launchers by allowing for the fire control of multiple grenade launchers from a single firing position.

2. Background Art

The need to increase the fire power of grenade launchers is a military necessity for both offensive and defensive tactical operations.

The "Big Shot" system makes it possible to increase the capacity of an existing grenade launcher system by a factor of sixteen without changing the in place wiring harness and by only making minor changes to the control panel. Additional launchers may be added up to a total of sixteen.

SUMMARY OF INVENTION

It is the object of this present invention to provide a system for increasing the capacity of the existing grenade launcher.

It is another object of this invention to provide this increase in capacity without changing the in place wiring harness and only making minor changes to the control panel.

It is another object of this invention to have additional launchers to be added to the system up to a total of sixteen.

These and other objects of the invention will become apparent to those skilled in the art upon consideration of the following description of the invention.

DETAILED DESCRIPTION OF THE PREFERRED EMBODIMENT

Figure 1:
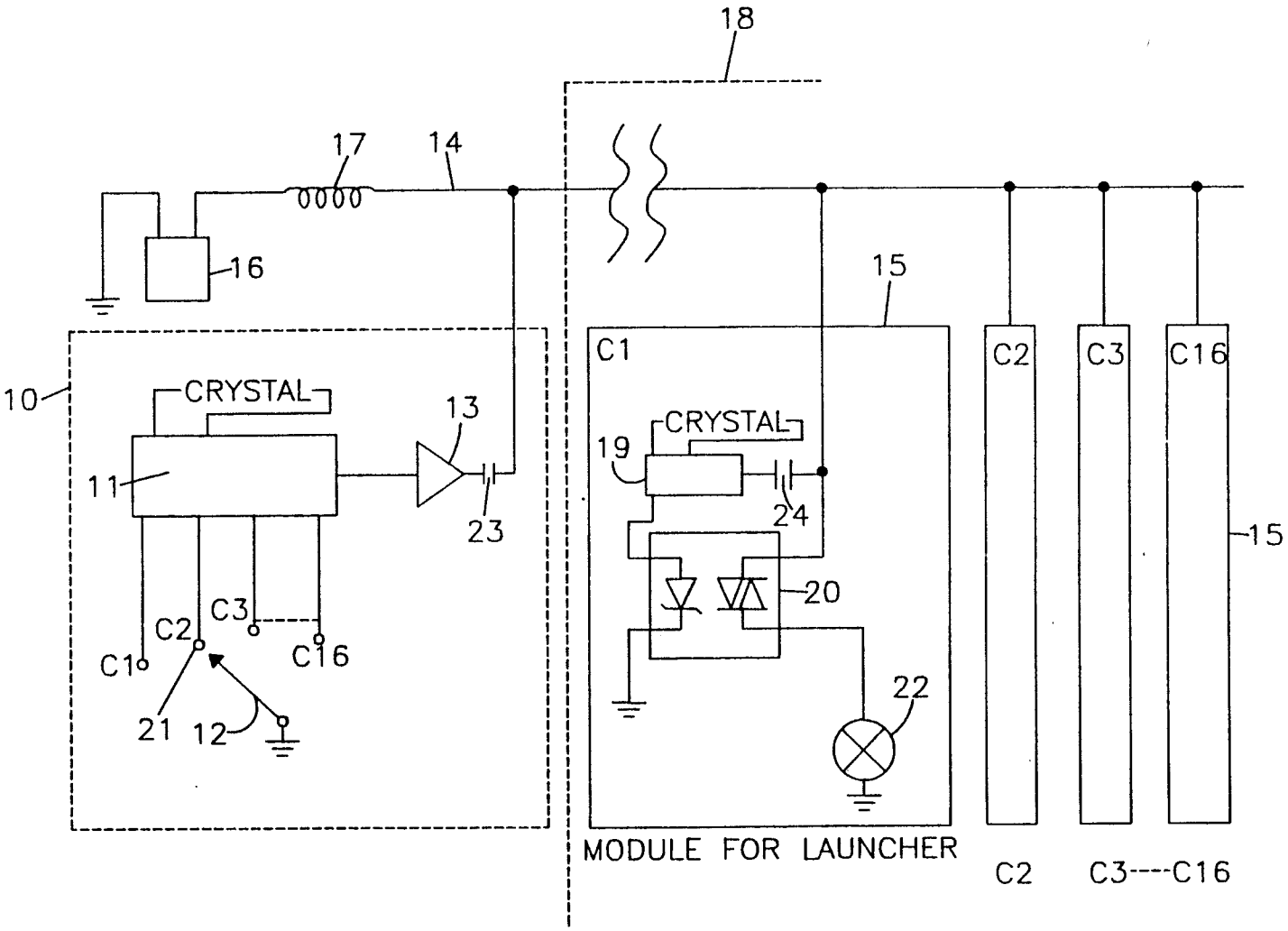
FIG. 1. is an electrical schematic of the BIG SHOT system.

Turning now to FIG. 1., it shows the system which can increase the capacity of the grenade launcher. The control panel 10 contains a crystal controlled tone generator 11 which provides one of up to sixteen tone pairs. The crystal controlled tone generator 11 may be the NTE 1690. The selector switch 12 is used to select the desired one of sixteen tone pairs by grounding the appropriate terminals 21 on the tone generator 11.

The selected tone pair is passed to a buffer amplifier 13 and put into the +28 volt DC line 14 which goes out to the launcher 18, or; to a distribution fan-out point to the launcher 15.

This +28 VDC line 14 is connected to the vehicle power 16 through a series inductor 17 which is installed to raise the line impedance for alternating current and prevent the control signals from being short circuited by the 28 VDC vehicle battery 16. Capacitors 23 and 24 are installed to allow AC coupling of the tone generator 11 and decoder 19 to the +28 VDC line 14.

Once the tone signal reaches the launcher location 18, it is applied to a crystal controlled tone decoder 19 (CS202). The tone decoder 19 determines which launcher 15 has been selected and delivers a hexidecimal output to a 1 of 16 decoder (74154) throuqh an inverter (7404) to the input of an optically triggered triac 20, causing it to operate thus applying +28 VDC to the squib 22 of the chosen grenade causing it to fire. The optically triggered triac 20 may be the optocoupler MOC3010. Up to sixteen launchers may be controlled by this system.

Thus it is apparent that in accordance with the present invention, a functional design that fully satisfies the objectives, aims and advantages is set forth above. While the invention has been described in conjunction with a specific embodiment, it is evident that many alternatives, modifications, and variations will become evident to those skilled in the art in light of the foregoing description. Accordingly, it is intended that the present invention embrace all such alternatives, modifications, and variations as fall within the spirit and broad scope of the appended claims; since the described system may be used or a generic control system for other applications.

What is claimed is:

1. A fire control system for simultaneously firing a plurality of grenade launchers comprising:

means to generate multiple respective tone pairs each for a respective selected grenade launcher;

means to select up to sixteen of said multiple respective tone pairs;

means to pass the selected tone pairs to the launchers;

means operatively connected to said launchers to decode the tone pair for a selected respective launcher; and means to activate a respective squib of a respective launcher to fire such selected respective grenade launcher.

2. The fire control system of claim 1 wherein the means to generate multiple tone pairs for selected grenade launchers is a crystal controlled tone generator.

3. The fire control system of claim 1 wherein the means to select up to sixteen tone pairs is a selector switch which grounds the appropriate terminals of the said tone generator.

4. The fire control system of claim 1 wherein the means to pass the tone pairs to the launchers is via a +28 VDC line connected to a vehicular power supply.

5. The fire control system of claim 1 wherein the means to decode the tone pair for a selected launcher is a crystal controlled decoder.

6. The fire control system of claim 1 wherein the means to activate the squib to fire the selected grenade launcher is an optically triggered triac.

7. The fire control system as in claim 1 in which the means to generate multiple tone pairs for selected grenade launchers is the crystal controlled tone generator NTE 1690.

8. The fire control system as in claim 1 in which the means to decode the tone pair for a selected launcher is the crystal controlled decoder CS202.

9. The fire control system as in claim 1 in which the means to activate the squip to fire the selected grenade launcher is the optocoupler MOC 3010.

10. The fire control system as in claim 1 which allows for selectivity of grenade launchers without changing any of the existing wiring harness.

* * * * *